United States Patent [19]

Moteki et al.

[11] Patent Number: 5,360,663
[45] Date of Patent: Nov. 1, 1994

[54] POLYESTER LAMINATES

[75] Inventors: Yoshihiro Moteki; Nobutaka Fujiwara; Yukiharu Euruichi, all of Kawasaki; Eiichiro Takiyama, Kamakura, all of Japan

[73] Assignee: Showa Highpolymer Co., Ltd., Tokyo, Japan

[21] Appl. No.: 49,422

[22] Filed: Apr. 20, 1993

[30] Foreign Application Priority Data

May 13, 1992 [JP] Japan ................................. 4-146461
May 14, 1992 [JP] Japan ................................. 4-148314

[51] Int. Cl.$^5$ .................... B32B 29/00; C08G 63/00; C07C 265/00
[52] U.S. Cl. .................... 428/290; 428/34.2; 428/352; 428/354; 428/423.1; 428/481
[58] Field of Search .................... 428/481, 290, 423.1, 428/34.2, 354, 352

[56] References Cited

U.S. PATENT DOCUMENTS 2,999,851  9/1961  Elmer .
4,166,873  9/1979  Gilliam .
5,068,143  11/1991  Agger et al. ..................... 428/241

FOREIGN PATENT DOCUMENTS 0323700  7/1989  European Pat. Off. .
0393819  10/1990  European Pat. Off. .
1059075  3/1954  France .
748872  5/1956  United Kingdom .

Primary Examiner—P. C. Sluby
Attorney, Agent, or Firm—Sughrue, Mion, Zinn, Macpeak & Seas

[57] ABSTRACT

Polyester laminates formed by coating by melt-extruding an aliphatic polyester having a melt viscosity of $1.0 \times 10^3$–$1.0 \times 10^5$ poises at a temperature of 190° C. and a shear rate of 100 sec$^{-1}$, and having a melting point of 70°–200° C. on to paper or cloth. The resin can be coated on paper or cloth at a low temperature with firm adherency, and the sheet thus formed is biodegradable.

9 Claims, No Drawings

POLYESTER LAMINATES

BACKGROUND OF THE INVENTION

1. Field of the Invention

The present invention relates to polyester laminates, for example, release base materials and base material for paper containers having excellent heat stability and mechanical strength which are prepared by using aliphatic polyesters with biodegradability and sufficiently high molecular weights and specific melt properties for practical use.

2. Discussion of the Background

As a release base material, one comprising a release layer laminated on a filling layer on one or both sides of a paper or a cloth has been well known, wherein said filling layer is a low density polyethylene having a long branched chain obtained by the ordinary high-pressure method, a medium density polyethylene obtained by blending a low density polyethylene with a high density polyethylene, or a composition obtained by blending a low density polyethylene with polypropylene.

Further, as for paper cups such as used for foods and drinks, for example, coffee, soup, miso-soup and instant noodles, paper trays for food, for example, pizza, daily dishes and food for microwave ovens and the like, at least inner surface where the content such as liquid contacts, a resin composition as same as aforementioned is conventionally laminated to provide a water-repellent layer.

In the current processes for producing the release base materials, it is required to melt-coat the polyolefins used as a filling layer as mentioned above on base materials at a high temperature over 315° C. in order to obtain close-adhesive and bonding properties between the polyolefins and the base materials.

Further, in the production of the base material for paper containers used for hot drinks and foods such as paper cups or paper trays, it is required to laminate the above-mentioned polyolefin compositions used as a water-repellent layer on the paper at a high temperature over 300° C. in order to coat the polyolefin composition firm to the paper.

Because of this high temperature melt-coating, the oxidative deterioration of the polyolefin themselves occurs, and the generation of a great volume of smoke is unavoidable. Consequently, not only is the condition of the working environment worsened, but also the living environment around the factory becomes polluted by the smoke exhausted from the factory, creating a great community problem. Accordingly, there has been a strong demand for improvement thereof. On the other hand, waste disposal of the used release papers by burying them in the earth is insufficient, since the base materials are laminated with unbiodegradable polyolefins. Furthermore, trying to recycle the paper from the used release papers, by soaking the paper in an alkaline aqueous solution followed by tearing off the polyolefins, is very difficult and required much labor and cost. Accordingly, there has also been a strong demand for development of a release base material which can be biodegraded together with other biodegradable base materials such as paper and cloth.

One object of the present invention is to develop a release base material filled with a polymer which can be molded at a low temperature in order to minimize the volume of generated smoke in the melt-coating process, which has good bonding and firm-adhesive properties to the base material such as paper and cloth and which can be decomposed by natural and ordinary microorganisms in the earth.

Another object of the present invention is to develop a novel base material for a paper-made container, by which the problems concerning the odor of the oxidatively deteriorated polyolefin remaining on the paper-made container because of the high temperature lamination and the generation of a great volume of smoke can be solved, and which gives the paper-made container biodegradability and is advantageous to the preservation of the natural environment, where undecomposable materials of the used container have been accumulated.

SUMMARY OF THE INVENTION

In the present invention, the above-mentioned object has been achieved by the development of aliphatic polyester laminates characterized by coating a base material consisting of paper or cloth by melt-extrusion with an aliphatic polyester having a melt viscosity of $1.0 \times 10^3 - 1.0 \times 10^5$ poises at a temperature of 190° C. and a shear rate of 100 sec$^{-1}$ and having a melting point of 70°–200° C.

In the present invention, the above-mentioned object has been achieved by developing a release base material using an aliphatic polyester laminate.

Further the present invention provides a paper container laminated with an aliphatic polyester having a melting point of 85°–200° C.

DETAILED DESCRIPTION OF THE INVENTION

The present invention will be described below in further detail.

The aliphatic polyester of the present invention mainly consists of a polyester obtained by reacting two components of glycols and dicarboxylic acid (or acid anhydrides thereof), and if necessary as a third component, with at least one polyfunctional compomnent selected from the group consisting of trifunctional or tetrafunctional polyols, oxycarboxylic acids, and polybasic carboxylic acids (or acid anhydrides thereof). The aliphatic polyesters are prepared by reacting relatively high molecular weight polyester prepolymers which have hydroxyl groups at both ends with a coupling agent so as to make them even higher molecular weight polymer.

It has been known to obtain polyurethane by reacting a low molecular weight polyester prepolymer having a number-average molecular weight of 2,000–2,500, which have hydroxyl groups as the terminal groups, with diisocyanate as a coupling agent in the preparation of rubbers, foams, coatings and adhesives.

However, the polyester prepolymers used in these polyurethane foams, coatings and adhesives are prepolymers having a low molecular weight and a number-average molecular weight of 2,000–2,500 which is the maximum that can be prepared by non-catalytic reaction. To obtain practical physical properties as the polyurethane, it is necessary that the content of diisocyanate should be as much as 10–20 parts by weight in relation to 100 parts by weight of this low molecular weight prepolymer. When such a large amount of diisocyanate is added to the low molecular weight polyester melted at 150° C. or higher, gelation occurs so that no normal resins which can be molded in the form of a melt can be obtained.

Therefore, polyesters which are obtained by reacting a large amount of diisocyanate with a low molecular weight polyester prepolymers as a raw material cannot be used as the plastic raw material for the base materials of the present invention.

Also, as shown in the case of polyurethane rubbers, although a method is coceivable in which hydroxyl groups are converted into isocyanate groups by the addition of diisocyanate, and then the number-average molecular weight thereof is further increased by using glycols, the same problem as mentioned above arises because 10 parts by weight of diisocyanate relative to 100 parts by weight of the prepolymer should be used in order to obtain practical physical properties.

When a relatively high molecular weight polyester prepolymer is to be used, heavy metal catalysts required to prepare the prepolymer would promote the reactivity of the above-mentioned isocyanate groups to undesirably cause poor preservativity, generation of cross-linking and branching; hence, a number-average molecular weight of not more than around 2,500 of polyester prepolymers would be the limit if they were to be prepared without catalysts.

The polyester prepolymers to obtain the aliphatic polyesters used in the present invention are relatively high molecular weight saturated aliphatic polyesters having substantially hydroxyl groups at the ends thereof, number-average molecular weights of at least 5,000, preferably at least 10,000, and a melting point of 60 ° C. or higher, which are obtained by reacting glycols and dibasic carboxylic acids (or acid anhydrides thereof) in the presence of catalysts.

When a prepolymer having a number-average molecular weight of lower than 5,000 is used, the small amounts of 0.1–5 parts by weight of coupling agents used in the present invention cannot provide polyesters for extrusion coating having good physical properties. When polyester prepolymers having number-average molecular weights of 5,000 or higher are used, with hydroxyl values of 30 or less, the use of small amounts of coupling agents even under severe conditions such as a molten state and the like can produce high molecular weight polyesters without gelation as the reaction is not affected by the remaining catalyst.

Therefore, the polymer for the base materials of the present invention has a repeated chain structure in which a polyester prepolymer having a number-average molecular weight of 5,000 or more, preferably 10,000 or more and consisting of an aliphatic glycol and aliphatic dicarboxylic acid is combined through the urethane bonds derived from, for example, diisocyanate as a coupling agent.

Further, the polymer for the base materials sheets of the present invention has a repeated chain structure in which the above-mentioned polyester prepolymer provided with branched long chains derived from polyfunctional components is combined through the urethane bonds derived from, for example, diisocyanate as a coupling agent. When oxazoline, diepoxy compounds, and acid anhydrides are used as a coupling agent, the polyester prepolymer has a repeated chain structure through ester bonds.

According to the present invention, there can be obtained a release base material which essentially comprises an aliphatic polyester having a melt viscosity of $1.0 \times 10^3 - 1.0 \times 10^5$ poises at a temperature of 190° C. and a shear rate of 100 sec$^{-1}$ and having a melting point of 70°–200° C. as a filling layer of, for example, adhesive sheets, binding tapes and the like.

Further, by using aliphatic polyesters having a melting point of 85°–200° C. and melt viscosity of $1.0 \times 10^3 - 1.0 \times 10^5$ poises at 190° C. and a shear rate of 100 sec$^{-1}$ for sealing material for a base material having good adherence, heat resistance can be made with small amount of smell of oxidative deterioration.

In particular, according to the present invention, since melt-coating is proceeded at a low temperature, very little smoke, which has been a cause of community problems, is generated if at all, and concomitant problems such as worsening of the working environment and environmental pollution around the factory by exhausted smoke, can be solved. Furthermore, since the resin used in the present invention is biodegradable by microorganisms, they can be disposed of by waste disposal means being buried in the earth.

Examples of glycols which can be used as a reaction component include aliphatic glycols. Among them, those having a straight chain alkylene group with even number carbon atoms of 2, 4, 6, 8 and 10 such as: ethylene glycol, 1,4-butanediol, 1,6-hexanediol, 1,8-octanediol, 1,10-decanediol, and mixtures thereof are preferable.

Of these glycols, those having a smaller number of carbon atoms, such as ethylene glycol, 1,4-butanediol and 1,6-hexanediol, are preferable because they can produce an aliphatic polyester having a high crystallinity and a high melting point. In particular, ethylene glycol and 1,4-butanediol are most suitable because they produce good results.

Examples of aliphatic dicarboxylic acids or anhydrides thereof which provide aliphatic polyester by reacting with glycols include aliphatic dicarboxylic acids. Among them those having a straight chain alkylene group with even number carbon atoms of 2, 4, 6, 8 and 10 such as: succinic acid, adipic acid, suberic acid, sebacic acid, 1,10-decanedicarboxylic acid, succinic anhydride and mixtures thereof are preferable. Of these dicarboxylic acids, those having a smaller number of carbon atoms, such as succinic acid, adipic acid and succinic anhydride, are preferable because they can produce an aliphatic polyester having high crystallinity and high melting points. In particular, succinic acid, succinic anhydride and an acid mixture of succinic acid or succinic anhydride and another dicarboxylic acid such as adipic acid, suberic acid, sebacic acid or 1,10-decanedicarboxylic acid are preferable.

In the system of an acid mixture containing two or more acid components, for example, succinic acid and other dicarboxylic acids, the mixing ratio of succinic acid is at least 70 mol %, preferably at least 90 mol %, and the mixing ratio of the other carboxylic acids is 30 mol % or less, preferably 10 mol % or less.

A combination of 1,4-butanediol and succinic acid or succinic anhydride and a combination of ethylene glycol and succinic acid or succinic anhydride are particularly preferable for the present invention because the combinations exhibit melting points close to that of polyethylene.

(Third component)

To these glycols and dicarboxylic acid, if necessary, may be added as a third component at least one polyfunctional component selected from the group consisting of trifunctional or tetrafunctional polyols, oxycarboxylic acid, and polybasic carboxylic acids (or acid anhydrides thereof). The addition of this third component, which causes the branching of long chains, can impart desirable properties in molten state to the polyester prepolymer, because the ratio of weight-average molecular weight (MW)/number-average molecular weight (Mn), i.e., the molecular weight distribution, increases with increases in its molecular weight.

In terms of the amount of polyfunctional components to be added without fear of gelation, a trifunctional component of 0.1–5 mole %, or a tetrafunctional component of 0.1–3 mole % is added relative to 100 mole % of the total of aliphatic dicarboxylic acid (or acid anhydride thereof) components.

(Polyfunctional components)

Examples of polyfunctional components as the third component include trifunctional or tetrafunctional polyols, oxycarboxylic acids, and polybasic-carboxylic acids.

The trifunctional polyols representatively include trimethylol propane, glycerin or anhydrides thereof. The tetrafunctional polyols representatively include pentaerythritol.

The trifunctional oxycarboxylic acid components are divided into the two types of (i) a component which has two carboxyl groups and one hydroxyl group in one molecule, and (ii) another component which has one carboxyl group and two hydroxyl groups in one molecule. Malic acid which has two carboxyl groups and one hydroxyl group in one molecule becomes practical and sufficient to the purposes of the present invention in view of commercial availability at low cost.

The tetrafunctional oxycarboxylic acid components are the following three types of components:

(i) A component which has three carboxyl groups and one hydroxyl group in one molecule;

(ii) Another component which has two carboxyl groups and two hydroxyl groups in one molecule; and (iii) The remaining component which has three hydroxyl groups and one carboxyl group in one molecule. Any type can be used, though in view of commercial availability at low cost, citric acid and tartaric acid are practical and sufficient to the purposes of the present invention.

As a trifunctional polybasic carboxylic acid (or acid anhydride thereof) component trimesic acid, propane tricarboxylic acid and the like can be used. Among them, trimesic anhydride is practical for the purposes of the present invention.

As a tetrafunctional polybasic carboxylic acid (or anhydride thereof) various types of aliphatic compounds, cycloaliphatic compounds, aromatic compounds and the like, described in certain literatures, can be used. In view of commercial availability, for example, pyromellitic anhydride, benzophenone tetracarboxylic anhydride and cyclopentane tetracarboxylic anhydride are practical and sufficient to the purposes of the present invention.

These glycols and dibasic acids are mainly consisted of aliphatic series, while small amounts of other components, for example, aromatic series may be concomitantly used. These other components may be blended and copolymerized in amounts up to 20% by weight, preferably up to 10% by weight, and more preferably up to 5% by weight because using these compounds degrades biodegradability.

The polyester prepolymer for aliphatic polyesters to be used in the present invention has hydroxyl groups at the terminals. To introduce the hydroxyl groups, it is necessary that glycols are used somewhat excessively.

For preparation of the polyester prepolymer having a relatively high molecular weight, it is necessary to use deglycol-reaction catalysts in the deglycol reaction subsequent to the esterification.

Examples of the deglycol-reaction catalysts include titanium compounds such as acetoacetoyl type titanium chelate compounds and organic alkoxy titanium compounds and the like. These titanium compounds can be used in combination. Examples of compounds used in combination include diacetoacetoxy oxytitanium (Nippon Chemical Industry Co., Ltd.; Nursem Titanium) tetraethoxy titanium, tetrapropoxy titanium, tetrabutoxy titanium and the like. The amount of the titanium compound used is 0.001–1 part by weight, and preferably 0.01–0.1 part by weight relative to 100 parts by weight of the polyester prepolymer. These titanium compounds may be blended before the esterification, or may be blended immediately before the deglycol-reaction.

As a result, polyester prepolymers having an acid-average molecular weight of at least 5,000, and preferably at least 20,000 and a melting point of 60° C. or higher, can be generally obtained easily. It is even more preferable if these polyester prepolymers have crystallization.

To the polyester prepolymer which has a number-average molecular weight of at least 5,000, preferably at least 10,000, and whose terminal groups are substantially hydroxyl groups are added coupling agents in order to increase its number-average molecular weight.

Examples of the coupling agents include diisocyanate, oxazoline, diepoxy compounds, acid anhydrides and the like. Diisocyanate is particularly preferred.

In the cases of oxazoline and diepoxy compounds, It is necessary that the terminal hydroxyl groups are reacted with acid anhydrides and the like to convert them into carboxyl groups, then coupling agents are used.

Although not limited, examples of diisocyanate include 2,4-tolylene diisocyanate, a mixture of 2,4-tolylene diisocyanate and 2,6-tolylene diisocyanate, diphenylmethane diisocyanate, 1,5-naphthylene diisocyanate, xylylene diisocyanate, hydrogenated xylylene diisocyanate, hexamethylene diisocyanate, isophorone diisocyanate and the like. Particularly, hexamethylene diisocyanate is preferably used in terms of hue of prepared resins, reactivity at the time of blending polyesters, and the like.

The adding amounts of these coupling agents are 0.1–5 parts by weight, and preferably 0.5–3 parts by weight relative to 100 parts by weight of polyester prepolymer.

Addition of less than 0.1 part by weight causes insufficient coupling reaction, whereas with more than 5 parts by weight gelation tends to occur.

The addition is preferably performed when the polyester is in a uniformly melted state under easily stirrable conditions. Although it is not impossible for the coupling agents to be added to the polyester prepolymer in the form of a solid and melted and mixed through an extruder, adding the agents in a polyester preparation unit, or adding them to polyester prepolymer in a melt state (for example, in a kneader) is more practical.

When urethane bonds are contained in the aliphatic polyester to be used in the present invention, the amount of urethane bonds is 0.03–3.0% by weight, preferably 0.05–2.0% by weight, and more preferably 0.1–1.0% by weight.

The amount of urethane bonds is measured by $^{13}C$ NMR, showing good correlation with the charged amount.

Less than 0.03% by weight of urethane has a little effect on polymerization and leads to poor molding properties, whereas more than 3% by weight causes gelation.

The aliphatic polyester to be used in the present invention is required to have selected melt properties for base materials. That is, in release base materials or base materials for paper containers, the aliphatic polyester resin to be used in the present invention preferably has a melt viscosity of $1.0 \times 10^3$–$1.0 \times 10^5$ poises at 190° C. at a shear rate of 100 sec$^{-1}$. Those having a melt viscosity of lower than $1.0 \times 10^3$ poises have defects in that surging and non-uniformity of the resin temperature easily occur and extruding stability is lost in the extrusion-molding process. Also, this results in the neck-in of the melt film becoming large making it difficult to lamination-mold in the lamination-molding process, resulting in thickness variations of the obtained laminate film, because of its melt viscosity being too low. On the other hand, those having a melt viscosity of higher than $1.0 \times 10^5$ poises also have some defects in that the motor load becomes large and the productivity decreases in the extrusion-molding process, and in that it becomes difficult to make a thin melt film in the lamination-molding process, because of its melt viscosity being too high. For these reasons, melt viscosity is preferably within the range of $2.0 \times 10^3$–$2.0 \times 10^4$ poise, and more preferably $2.5 \times 10^3$–$1.2 \times 10^4$ poise.

The melting point of the aliphatic polyester to be used in the present invention is preferably 70° C.–200° C. A melting point of lower than 70° C. gives poor heat resistance in the silicone coating process and in the adhesive agent coating process. Such an aliphatic polyester must be treated at low temperature, and requires a long time to dry and remove the solvents of silicone or adhesive agent. Accordingly, an aliphatic polyester having such a melting point is not preferable.

On the other hand, although an aliphatic polyester having a melting point of higher than 200° C. shows an sufficient heat resistance, its rate of biodegradation slows down, and consequently, such an aliphatic polyester is also not preferable. For these reasons, the melting point of the aliphatic polyester is preferably 60° C.–200° C., and more preferably 80° C.–150° C.

The melt temperature of the aliphatic polyester to be used for the base material for paper container in the present invention is preferably 85° C.–200° C. A melting point of lower than 85° C. is not preferable, since it will give paper cups and trays poor heat resistance to hot drinks, etc. resulting in release and melting of the laminated aliphatic polyester composition and release of the joint. On the other hand, a melting point higher than 200° C. of melting point is also not preferable, since it makes the biodegradation rate of the paper cups or trays slow down when decomposed by microorganisms in the earth. Therefore, the melt temperature is preferably 90° C.–150° C., and more preferably 100° C.–140° C.

In the present invention, the base material for a paper-made container can be prepared by laminating the aliphatic polyester resin obtained by the above-mentioned process on a base paper by T-die method. In this process, the temperature of the resin to be extruded is 150°–290° C. When the resin temperature is lower than 150° C., the melt viscosity is too high, and hence the motor load becomes large and the productivity decreases in the extrusion-molding process, and it becomes difficult to make a thin melt film in the lamination-molding process as well. On the other hand, when the resin temperature is higher than 290° C., the resin composition deteriorates and loses extrusion stability because of the occurrence of surging, and it is difficult to lamination-mold since the neck-in [a phenomenon in which during the lamination-molding process the width of the melt film discharged from T-die becomes narrow in the space between the melt film and a base material, where the melt film has not yet contacted with the base material, and it is expressed by the difference of widths between the melt film at the T-die outlet and the laminated film laminated on the base material] of the melt film is large and not stable in the lamination-molding process. Furthermore, a great volume of smoke is generated in the molding process, and not only the condition of the working environment but also the odor of the obtained laminated paper gets worse. For these reasons, the resin temperature is preferably 160°–285° C., and more preferably 170°–275° C.

In the process for making a base material for a paper container of the present invention, in which an aliphatic polyester resin is extruded and then laminated on a base paper, a general screw-type extruder and laminator can be used. An example of a molding process is one in which a melt resin comprising an aliphatic polyester resin is extruded on one side of the base paper supplied at a speed of 20–200 m/min, and seal-joined by press with the base paper at the position between the cooling roll and the press roll. After cooling and hardening the melt resin by contact with the surface of the cooling roll, this is rolled up or piled up on the cutting stand through the continuous cutter. The cooling roll to be used in the present invention may be any one used for surface-finishing such as a mat finishing type, semi-mat finishing type, mirror finishing type and the like. Among these, a mat finishing type of cooling roll is preferable in view of the stacking property of the resulting paper cups and trays (that is, paper cups, etc. are pulled out one by one from their stacks, that is required when used for vending machines) and releasability of resultants from the roll in the lamination-molding process.

Furthermore, according to the present invention, in the space between a melt film extruded from T-die and a board paper where the melt film is not yet contacted with the paper, i.e., an air gap, the surface of the melt film to be contacted with the plate paper may be sprayed with ozone gas and the like in order to strengthen the firm-adhesiveness and bonding property to the board paper.

In order to enhance the adhesiveness to the plate paper, adhesive-applying agents such as terpene-based resins and adhesive resins such as ionomers, ethylene-acrylate ester copolymer and acid-modified polyolefines may be added to the aliphatic polyester composition so that the functions of the laminated paper of the present invention would not be lost.

In addition, the method in which the board paper is previously treated by, for example, anchor-coat treatment, corona treatment, flame treatment, and the like, may be employed in order to strengthen the firm-adhesiveness and the bonding property to the laminated film.

In the present invention, an alphatic polyester prepared by using additionally a small amount (0.2–1.0 mol %) of polyols which has more than 3 of hydroxyl group (—OH) or polybasic carboxylic acid monomer which has more than 3 of carboxyl group (—COOH) in one molecule, has a widened molecular weight distribution and long chain branches, as molding pressure becomes lower resulting in smaller necking-in and surging, thus improving film farmability.

As the above-mentioned aliphatic polyester to be laminated according to the present invention, the polyester having no long chain branch alone can be naturally employed; alternatively, a polyester which have long chain branch may be used, or mixture thereof may also be used. However, when smaller necking-in is desired, a polyester having long chain branch may preferably be blended.

It is needless to say when the polyester resin of the present invention is used, lubricants, waxes, coloring agents, fillers and the like can be used concomitantly, necessary. Among these, lubricants such as VITON, are especially very effective in improving the smoothness of the surface.

EXAMPLES

The present invention will be illustrated with reference to the following Examples and Comparative Examples but the invention is not intended to be limited only thereto.

Example 1

A 700 L reactor was purged with nitrogen, then 183 kg of 1,4-butanediol and 224 kg of succinic acid were charged in it. After the temperature was elevated under nitrogen stream, esterification by dehydration condensation was carried out for 3.0 hr at 195°–210° C., and after ceasing nitrogen charge, for further 3.5 hr under reduced pressures of 15–5 mmHg. A sample collected had an acid value of 6.3 mg/g, a number-average molecular weight (Mn) of 5,200 and a weight average molecular weight (Mw) of 10,100. Subsequently, 34 g of tetraisopropoxy titanium, a catalyst, was added at normal pressures under nitrogen stream. The temperature was elevated to carry out a deglycol-reaction at temperatures of 215°–220° C. under reduced pressures of 5–0.2 mmHg for 7.5 hr. A sample collected had a number-average molecular weight (Mn) of 18,600 and a weight average molecular weight (Mw) of 50,300. The yield of resulting polyester prepolymer (A1) was 339 kg except condensate water.

4070 g of hexamethylene diisocyanate was added to the reactor containing 339 kg of the polyester prepolymer (A1) to perform a coupling reaction for 1 hr at 180°–200° C. The viscosity was rapidly increased, but no gelation occurred. Then, 170 kg of Irganox 1010 (Ciba-geigy) as an antioxidant and 1.70 kg of calcium stearate as a lubricant were added, and the mixture was further stirred for 30 min. The resulting reaction product was extruded into water, and cut by a cutter into pellets. The aliphatic polyester (B1) obtained after drying in a vacuum at 90° C. for 6 hr had a yield of 270 kg.

The obtained polyester (B1) was a slightly ivory-like white, waxy crystal, and had a melting point of 110° C., a number-average molecular weight (Mn) of 29,500 a weight-average molecular weight (Mw) of 127,000, a MFR (190° C.) of 9.2 g/10 min, a viscosity of 170 poises in a 10% orthochlorophenol solution and a melt viscosity of $8.0 \times 10^3$ poises at a temperature of 190° C. at a shear rate of 100 $sec^{-1}$. The average molecular weight was measured by a Shodex GPC System-11 (Showa Denko, gel permiation chromatography) using a HFIPA solution containing 5 mmol $CF_3COONa$ (concentration of 0.1% by weight) as a medium. A calibration curve was drawn using a PMMA standard sample (Shodex Standard M-75, Showa Denko).

Next, the polyester resin (B1) was extruded by using an extruder having a screw diameter of 50 mm$\phi$ and L/D=28 with a T-die of 320 mm width under the conditions of 0.8 mm of die lip gap and 120 mm of air gap at a resin temperature of 220° C. at a speed of 150 m/min, followed by coating 20 $\mu$m thick on a slick paper (70 g/$m^2$) to obtain a release base material. The selvage of the thin film was stable and there was little generation of smoke in the molding process. In this manner, the release base material could be stably molded.

The obtained release base material had sufficient close-adhesiveness between paper and polyester, and cohesive failure of the paper was observed in the peeling test with no interfacial peeling.

The release base material was cut into a 10 cm×20 cm of rectangular pieces and they were mounted on square frames made of stainless steel with the pieces held between polyethylene nets. The obtained test pieces were then buried in the earth at a depth of 10 cm to evaluate biodegradability. The test site was the grounds of Kawasaki Plastics Laboratory, SHOWA DENKO K.K. (Kawasaki-ku, Kawasaki-shi). After three months, the test pieces were dug up from the earth. The polyester thin films were more decomposed than paper fibers and had crumbled into decay.

Example 2

The polyester (B1) was molded by using the same laminator as Example 1, under the same conditions as Example 1 except for employing a molding temperature of 190° C. and a line speed of 100 m/min. In this molding process, no smoke was generated and the film could be stably molded. The film thickness of polyester layer in the obtained release base material was 30 $\mu$m in average.

The firm-adhesiveness between paper and polyester layer of the release base material was sufficient, and cohesive failure of the paper was observed in the peeling test. When the obtained laminate was tested for heat resistance in a circulating air oven at 100° C., only two pinholes appeared and the gloss of its surface had changed little. Therefore, the resultant product had sufficient properties as a release base material of the present invention. Further, biodegradability was evaluated in the same manner as Example 1, and the film had many holes and crumbled into decay.

Comparative Example 1

An attempt was made to coat the same polyester (B1) as in Example 1 was attempted to coat on a slick paper by using the same laminator as in Example 1 at 145° C. In this coating process, there was little smoke generated and the obtained film was stable. However, when However, when the molding speed was elevated cracking occurred at the selvage of the film. Accordingly, in this case, the lower limit of the thickness of the obtained film was 60 $\mu$m. On the other hand, in evaluating heat resistance of the laminate, the degree of change in the surface gloss depending on temperature was slight, and this was an sufficient result in this respect. However, the close-adhesiveness between the film and the paper was bad and interfacial peeling occurred. Therefore, the obtained product was undesirable as a release base material of the present invention.

Comparative Example 2

An attempt was made to coat the same polyester (B1) as in Example 1 on a paper by using the same laminator as in Example 1 at 300° C. In this coating process, the obtained thin film surged from side to side when it was discharged from a T-die, and it was impossible to coat a paper in a constant width and thickness. Furthermore, a large volume of smoke was generated, and it was a bad condition for the working environment.

Accordingly, the release base material was not evaluated for heat resistance, close-adhesiveness, biodegradability, and the like.

Example 3

A 700 L reactor was purged with nitrogen, then 183 kg of 1,4-butanediol and 224 kg of succinic acid were charged in it. After the temperature was elevated under nitrogen stream, esterification by dehydration condensation was carried out for 3.5 hr at 192°–220° C., and after ceasing nitrogen charge, for further 3.5 hr under reduced pressures of 20–2 mmHg. A sample collected had an acid value of 9.2 mg/g, a number-average molecular weight (Mn) of 5,160 and a weight average molecular weight (Mw) of 10,670. Subsequently, 34 g of tetraisopropoxy titanium, a catalyst, was added at normal pressures under nitrogen stream. The temperature was elevated to carry out a deglycol-reaction at temperatures of 215°–220° C. under reduced pressures of 15–0.2 mmHg for 5.5 hr. A sample collected had a number-average molecular weight (Mn) of 16,800 and a weight average molecular weight (Mw) of 43,600. The yield of resulting polyester prepolymer (A2) was 339 kg except condensate water.

5.42 kg of hexamethylene diisocyanate was added to the reactor containing 339 kg of the polyester prepolymer (A2) to perform a coupling reaction for 1 hr at 180°–200° C. The viscosity was rapidly increased, but no gelation occurred. Then, 1.70 kg of Irganox 1010 (Ciba-geigy) as an antioxidant and 1.70 kg of calcium stearate as a lubricant were added, and the mixture was further stirred for 30 min. The resulting reaction product was extruded into water, and cut by a cutter into pellets. The aliphatic polyester (B2) obtained after drying in a vacuum at 90° C. for 6 hr had a yield of 300 kg.

The obtained polyester (B2) was a slightly ivorylike white, waxy crystal, and had a melting point of 110° C., a number-average molecular weight (Mn) of 35,500 a weight-average molecular weight (Mw) of 170,000, a MFR (190° C.) of 1.0 g/10 min, a viscosity of 230 poises in a 10% ortho-chlorophenol solution and a melt viscosity of $1.5 \times 10^4$ poises at a temperature of 190° C. at a shear rate of 100 sec$^{-1}$. The average molecular weight was measured as in Example 1.

Next, the polyester (B2) was extrusion-laminated on a slick paper (70 g/m$^2$) by using of the laminator of Example 1 at 230° C. at a line speed of 100 m/min to obtain a release base material having a thickness of 30 μm.

In the molding process, there was little smoke generated, the selvage of the obtained thick film was stable, and laminate having a uniform film width film and thickness could be obtained.

The obtained release base material showed sufficient heat resistance and strong close-adhesiveness to the paper, and cohesive failure of the paper was observed in the peeling test. When its biodegradability was evaluated in the same manner as Example 1, after three months, it was observed that there were appeared numerous little holes on the polyester film and the film had partially disappeared. From these results, it was confirmed that decomposition of the film had processed highly.

Meanwhile, a film comprised of a low density polyester having a thickness of 20 μm was also evaluated for biodegradability in the earth in the same manner as Example 1. However, there was no change recognized in appearance and weight, and little change in tensile strength and breaking extension of the polyethylene film, and therefore, decomposition had not proceeded.

Example 4

A 700 L reactor was purged with nitrogen, then 177 kg of 1,4-butanediol, 198 kg of succinic acid and 25 kg of adipic acid were charged in it. After the temperature was elevated under nitrogen stream, esterification by dehydration condensation was performed for 3.5 hr at 190°–210° C., and after ceasing nitrogen charge, for further 3.5 hr under reduced pressures of 20–0.2 mmHg. A sample collected had an acid value of 9.6 mg/g, a number-average molecular weight (Mn) of 6,100 and weight-average molecular weight (Mw) of 12,200. Subsequently, 20 g of tetraisopropoxy titanium, a catalyst, was added at normal pressures under nitrogen stream. The temperature was elevated to perform a deglycol-reaction at temperatures of 210°–220° C. under reduced pressures of 15–0.2 mmHg for 6.5 hr. A sample collected had a number-average molecular weight (Mn) of 17,300 and a weight-average molecular weight (Mw) of 46,400. The resulting polyester (A3) had a yield of 337 kg except condensate water.

4.66 kg of hexamethylene diisocyanate was added to the reactor containing 337 kg of polyester (A3) to perform a coupling reaction for 1 hr at 180°–200° C. The viscosity was rapidly increased, but no gelation occurred. Then, 1.70 kg of Irganox 1010 (Ciba-Geigy) as an antioxidant and 1.70 kg of calcium stearate as a lubricant were added, and the mixture was further stirred for 30 min. The resulting reaction product was extruded into water by an extruder, and cut by a cutter into pellets. The aliphatic polyester (B3) obtained after drying in a vacuum at 90° C. for 6 hr had a yield of 300 kg.

The obtained polyester (B3) was a slightly ivory-like white, waxy crystal, and had a melting point of 103° C., a number-average molecular weight (Mn) of 36,000, a weight-average molecular weight (Mw) of 200,900, a MFR (190° C.) of 0.52 g/10 min, a viscosity of 680 poises in a 10% orthochlorophenol solution and a melt viscosity of $2.2 \times 10^4$ poises at a temperature of 190° C. at a shear rate of 100 sec$^{-1}$.

The polyester (B3) was extrusion-laminated on a slick paper (70 g/m$^2$) at 270° C. at a line speed of 150 m/min. In the molding process, although the selvage of the film became somewhat thick, the film width and thickness were stable and, therefore, it was possible to mold the film stably.

There was a little smoke was generated, but it was not enough to be a problem. When the obtained laminate was tested for heat resistance at 100° C., a few pinholes were appeared and the surface gloss had changed to a small degree. The close-adhesiveness to the paper was sufficient, and cohesive failure of the paper occurred.

When a biodegradable test was made in the same manner as in Example 1, after two months, numerous holes had already appeared on the film and the film had crumbled into decay.

Example 5

A 70 L reactor was purged with nitrogen, then 20.0 kg of 1,4-butanediol, 25.0 kg of succinic acid and 284 g of trimethylol propane were charged in it. After the temperature was elevated under nitrogen stream, esterification by dehydration condensation was performed for 3.5 hr at 192°–220° C., and after ceasing nitrogen charge, for further 2.5 hr under reduced pressures of 20–2 mmHg. A sample collected had an acid value of 2.5 mg/g, a number-average molecular weight (Mn) of 8.660 and a weight average molecular weight (Mw) of 9,520. Subsequently, 3.7 g of tetraisopropoxy titanium, a catalyst, was added at normal pressures under nitrogen stream. The temperature was elevated to perform a deglycol-reaction at temperatures of 210°–220° C. under reduced pressures of 15–0.3 mmHg for 8 hr. A sample collected had a number-average molecular weight (Mn) of 16,200 and a weight-average molecular weight (Mw) of 67,900 (Mw/Mn=5.4). The resulting polyester (A4) had a yield of 36.7 kg except condensate water.

33.0 g of hexamethylene diisocyanate was added to the reactor containing 36.7 kg of polyester (A4) to perform a coupling reaction for 1 hr at 170°–185° C. The viscosity was rapidly increased, but no gelation occurred. Then, 37 g of Irganox 1010 (Ciba-Geigy) as an antioxidant and 37 g of calcium stearate as a lubricant were added, and the mixture was further stirred for 30 min. The resulting reaction product was extruded into water by an extruder, and cut by a cutter into pellets. The polyester (B4) obtained after drying in a vacuum at 90° C. for 6 hr had a yield of 36 kg.

The obtained polyester (B4) was a slightly ivorylike white, waxy crystal, and had a melting point of 110° C., a number-average molecular weight (Mn) of 25,600 a weight-average molecular weight (Mw) of 122,000 (Mw/Mn=4.8), a MFR (190° C.) of 18 g/10 min and a melt viscosity of $4.0 \times 10^3$ poises at a temperature of 190° C. at a shear rate of 100 sec$^{-1}$. The average molecular weight was measured in the same manner as in Example 1.

Next, the polyester resin (B4) was extruded by using an extruder having a screw diameter of 50 mm$\phi$ and L/D=28 with a T-die of 320 mm width under the conditions of 0.8 mm of die lip gap and 120 mm of air gap at a resin temperature of 220° C. at a speed of 150 m/min, followed by coating 20 $\mu$m thick on a slick paper (70 g/m$^2$) to obtain a release base material. The selvage of the thin film was stable and there was little generation of smoke in the molding process. In this manner, the release base material could could be stably molded.

The obtained release base material had sufficient close-adhesiveness between paper and polyester, and cohesive failure of the paper was observed in the peeling test with no interfacial peeling.

The release base material was cut into a 10 cm×20 cm of rectangular pieces and they were mounted on square frames made of stainless steel with the pieces held between polyethylene nets. The obtained test pieces were then buried in the earth at a depth of 10 cm to evaluate biodegradability. The test site was the grounds of Kawasaki Plastics Laboratory, SHOWA DENKO K.K. (Kawasaki-ku, Kawasaki-shi). After three months, the test pieces were dug up from the earth. The polyester thin films were more decomposed than paper fibers and had crumbled into decay.

Example 6

A polyester composition consisting of a polyester (B4) used in Example 5 and (B1) in a ratio of 3:7 was pelletized and was molded by using the same laminator as Example 1, under the same conditions as Example 1 except for employing a molding temperature of 190° C. and a line speed of 150 m/min. In this molding process, no smoke was generated and the film could be stably molded. The film thickness of polyester layer in the obtained release base material was 25 $\mu$m in average.

The firm-adhesiveness between paper and polyester layer of the release base material was sufficient, and cohesive failure of the paper was observed in the peeling test. When the obtained laminate was tested for heat resistance in a circulating air oven at 100° C., only two pinholes appeared and the gloss of its surface had changed little. Therefore, the resultant product had sufficient properties as a release base material of the present invention. Further, biodegradability was evaluated in the same manner as Example 1, and the film had many holes and crumbled into decay.

In Examples 1 to 6 and Comparative Examples 1 to 2, following tests were carried out.

[The method for Evaluating of Molded Films Stability]
○: Film width stable and thickness variation was small at molding.
Δ: Between ○ and x.
x: Film width unstable and film swinged from side to side at molding. Film thickness also unstable and the thickness variation was large.

[Generation of Smoke]
a little: Substantially no smoke generated.
medium: A little smoke was generated.
abundant: Dense white smoke generated, and person opposite can hardly be seen.

[Heat Resistance]
The heat resistance was judged on the basis of the changing degree of gloss and the number of pinholes after the film was left in a circulating air oven at 100° C. or 110° C. for two minutes.
Degree of gloss change
5% or less: ○
5–10%: Δ
10% or more: x
Pinholes; The number of pinholes was counted after painting the surface with a colored alcohol.
1–10 holes/0.1 m$^2$: ○
more than 10 holes/0.1 m$^2$: x

[Firm-adhesive Property]
The firm-adhesive properties were judged by observation of the behavior of the laminated film upon tearing up the processed laminate paper by hand followed by peeling off its laminated film.
○: Cohesive failure of the paper.
Δ: Partial cohesive failure of the paper as well as a partial interfacial peeling between paper and film.
x: Interfacial peeling between paper and film.

[Biodegradability]
○: Decomposition recognized within three months after burying in earth.
x: Decreasing ratio of weight of 5 % or less and changing ratio of tensile strength and breaking extension of 50 % or less even after one year.
Δ: Between ○ and Δ.

Example 7

The polyester resin (B1) used in Example 1 was extruded by using an extruder having a screw diameter of 50 mm$\phi$ and L/D=28 with a straight manifold T-die of 320 mm wide under the conditions of 0.8 mm of die lip gap and 120 mm of air gap at a resin temperature of 220° C., followed by laminating 20 μm thick on a base paper (280 g/m²) which was previously treated by a corona treatment method (treatment rate: 30 w min/m²) supplied at a speed of 150 m/min to obtain a base material for a paper-made container. In the lamination-molding process, the melt film was stable and the stability of the molded film was excellent. Furthermore, there was little generated smoke and the condition of the working environment was good.

The evaluation results of the obtained base material are shown in Table 2.

The release base material was cut into 10 cm×20 cm rectangular pieces and they were mounted on square frames made of stainless steel with the pieces held between polyethylene nets. The obtained test pieces were then buried in the earth at a depth of 10 cm to evaluate biodegradability. The test site was the grounds of Kawasaki Plastics Laboratory, SHOWA DENKO K.K. (Kawasaki-ku, Kawasaki-shi). After three months, the test pieces were dug up from the earth. The polyester thin films were more decomposed than paper fibers and had crumbled into decay.

Example 8

The aliphatic polyester resin (B1) was extruded and laminated 20 μm thick on a base paper supplied at a speed of 100 m/min in the same manner as Example 7 at a resin temperature of 190° C. to obtain a base material for a paper container. In the lamination-molding process, the melt film was stable and the stability of molded film was excellent. Furthermore, there was little smoke and the condition of the working environment was good.

The evaluation results of the obtained base material are shown in Table 2.

Comparative Example 3

The aliphatic polyester resin (B1) was extruded and laminated 60 μm thick on plate paper supplied at a speed of 50 m/min in the same manner as Example 7 at a resin temperature of 145° C. to obtain a base material for a paper containers. However, since the melt viscosity was too high, it was difficult to make a thin polyester resin layer. In this process, the lower limit of thickness of the polyester resin layer was 60 μm and it could not be made any thinner. In the lamination-molding process, the melt film was stable and there was little generated smoke.

The evaluation results of the obtained base material are shown in Table 2.

Comparative Example 4

Another lamination-molding was attempted by using the aliphatic polyester resin (B1) used in Example 1 at a resin temperature of 300° C. However, in this process, the melt film of the composition surged violently and a laminate film with a constant width and thickness could not be obtained. Other evaluation results of the obtained base material are shown in Table 2.

Example 9

The aliphatic polyester resin (B2) used in Example 3 was extruded 30 μm thick on a base paper supplied at a speed of 100 m/min in the same manner as Example 7 at a resin temperature of 230° C. to obtain a base material for a paper-made container. In the lamination-molding process, the molded film was stable and, furthermore, there was a little generated smoke and the condition of the working environment was good.

The evaluation results of the obtained base material are shown in Table 2.

Example 10

The aliphatic polyester resin (B2) used in Example 3 was extruded in 20 μm thick on a base paper supplied at a speed of 100 m/min in a same manner as Example 1 at a resin temperature of 270° C. to obtain a base material for a paper container. In the lamination-molding process, although the neck-in was somewhat large, the evaluation was ◯ and the molded film was stable. On the other hand, although there was a little generated smoke and its evaluation was Δ, deterioration level of the working environment was not serious.

The evaluation results of the obtained base material are shown in Table 2.

Comparative Example 5

A low density polyethylene compound having a melt temperature of 108° C., a shear viscosity of $5.5 \times 10^3$ poise at a temperature of 190° C. at a shear rate of 100 sec$^{-1}$ and MFR of 5 g/10 min, was extruded on a base paper supplied at a speed of 50 m/min in the same manner as Example 1 at resin temperature of 315° C. to obtain a base material for a container. In the lamination-molding process, the neck-in was small and the evaluation was ◯, and therefore, the stability of the molded film was very good. On the other hand, although there was a little bit much generation of smoke and the evaluation was Δ, the working environment was not seriously deteriorated.

The evaluation results of the obtained base material are shown in Table 1.

Example 11

The polyester resin (B4) used in Example 5 was extruded by using an extruder having a screw diameter of 50 mm$\phi$ and L/D=28 with a strait manifold T-die 320 mm wide under the conditions of 0.8 mm of die lip gap and 120 mm of air gap at a resin temperature of 220° C., followed by laminating 20 μm thick on a base paper (280 g/m²) which was previously treated by a corona treatment (treatment rate: 30 w min/m²) supplied at a speed of 150 m/min to obtain a base material for a paper-made container. In the lamination-molding process, the melt film was stable and the stability of the molded film was excellent. Furthermore, there was little generated smoke and the condition of the working environment was good.

The evaluation results of the obtained base material are shown in Table 2.

The release base material was cut into 10 cm×20 cm rectangular pieces and they were mounted on square frames made of stainless steel with the pieces held between polyethylene nets. The obtained test pieces were then buried in the earth at a depth of 10 cm to evaluate biodegradability. The test site was the grounds of Kawasaki Plastic Laboratory, SHOWA DENKO K.K.

(Kawasaki-ku, Kawasaki-shi). After three months, the test pieces were dug up from the earth. The polyester thin films were more decomposed than paper fibers and had crumbled into decay.

Example 12

The aliphatic polyester resin (B4) used in Example 5 was extruded 30 μm thick on a base paper supplied at a speed of 100 m/min in the same manner as Example 7 at a resin temperature of 190° C. to obtain a base material for a paper-made container. In the lamination-molding process, the molded film was stable and, furthermore, there was a little generated smoke and the condition of the working environment was good.

The evaluation results of the obtained base material are shown in Table 2.

Example 13

The polyester (B1) and the polyester (B4) having long chain branch were blended (1:1) and pelletized by an extruder (50 mmφ) to make a polyester (C1). The polyester (C1) was laminated on a base paper fed at 180 m/min, at resin temperature of 210° C. and 20 μm thick as the same manner as in Example 7, to make base material for paper container. Smoking was observed few without polluting a working environment.

The laminated material was tested for biodegradability as the same manner as in Example 7. The test site was the grounds of Kawasaki Plastic Laboratory, SHOWA DENKO K.K. (Kawasaki-ku, Kawasaki-shi). After three months, the test pieces were dug up from the earth. The polyester thin films were more decomposed than paper fibers and had crumbled into decay.

The evaluation of the base materials obtained in Example 7-13 and Comparative Example 3-5 were carried out as follows. The results are shown in Table 2.

1) Stability of the molded film: Judged by both of neck-in stability of a melt film and thickness stability of a laminated film.

◯: Neck-in of melt film was 80 mm or less and little variation recognized in the lamination-molding process, and thickness variation of laminated film except its selvage portion was within 10 %.

x: Neck-in of melt film over 80 mm and variation was over 10 mm at selvage, and thickness variation of laminated film except at selvage portion was over 10 %.

2) Generation of smoke: Determination by generation of smoke of a melt film in lamination-molding process. An evaluation of Δ or more was preferable.

◯: Substantially no smoke generated in the lamination-molding process, and around T-die the driving side could be seen from the operating side clearly.

Δ: A little smoke was generated in the lamination-molding process, and around T-die the motor side could be seen from the operating side with some difficulty. The condition of the working environment was not too bad.

x: Much smoke was generated in the lamination-molding process, and around T-die the driving side could hardly be seen from the operation side. The condition of the working environment was bad.

3) Firm-adhesiveness: Determined by observation of behavior of laminated film upon tearing it up by hand followed by peeling off its laminated film.

◯: Laminated film roped very little, no peeling off of laminated film alone occurred but accompanied by cohesive failure of paper.

Δ: Laminated film roped much, and interfacial peeling off laminated film occurred partially but peeling resistance was strong.

x: Laminated film not broken but stretched by tearing up, and interfacial peeling off occurred easily.

4) Odor: Determined by a sensory evaluation of air odor in an odor bag. The odor bag used in this evaluation was prepared by heat seal process in which a laminated paper was cut into 20 cm×20 cm squares, and fresh air was packed in the odor bag with the resin composition side to the inside. The evaluation of air odor was a sensory evaluation compared with the odor of the air packed in a paper laminated with low density polyethylenes which is used for current paper cups as the criterion air odor. The sensory evaluation was carried out by panelists who could distinguish five different criterion air odors.

◯: Air odor of laminated paper of present invention was same or inferior to that of criterion air odor.

x : Air odor of laminated paper of the present invention was stronger than that of criterion air odor.

5) Heat resistance: A paper cup for a vending machine was prepared by using the obtained base material, and then a colored boiling hot water was poured into the paper cup. The heat resistance was evaluated by observation of the hot water soaking into the paper cup and release of the joint of the paper cup.

◯: No soaking of hot water or release of the joint observed.

x: Soaking of hot water or release of the joint was observed.

6) Biodegradability: A laminated paper cut into 10 cm×20 cm pieces and mounted on a stainless steel frame with polyethylene net at its frame window, and then buried in the earth at a depth of 10 cm. After three months, the test pieces were dug up and subjected to the biodegradability evaluation. An evaluation result of 0 is desirable.

◯: Decomposition degree of aliphatic polyester composition was superior to that of paper in the laminated paper, and composition had holes on its surface and had crumbled into decay.

x: Decomposition of the aliphatic polyester composition was inferior to that of the paper in the laminated paper, and aliphatic polyester composition was firm.

TABLE 1

| | Melt viscosity (poises)* | Melting point (°C.) | Molding temperature (°C.) | Molding speed (m/min) | Stability of film molding |
|---|---|---|---|---|---|
| Ex. 1** | 7 × 10³ | 110 | 220 | 150 | ◯ |
| Ex. 2 | 7 × 10³ | 110 | 190 | 100 | ◯ |
| CEx. 1** | 7 × 10³ | 110 | 145 | 50 | ◯ |
| CEx. 2 | 7 × 10³ | 110 | 300 | — | X |
| Ex. 3 | 1.6 × 10⁴ | 113 | 230 | 100 | ◯ |
| Ex. 4 | 2 × 10⁴ | 103 | 270 | 150 | ◯ |
| Ex. 5 | 4 × 10³ | 110 | 220 | 150 | ◯ |
| Ex. 6 | 5.2 × 10³ | 110 | 190 | 100 | ◯ |
| Ex. 7 | 7 × 10³ | 110 | 220 | 150 | ◯ |
| Ex. 8 | 7 × 10³ | 110 | 190 | 100 | ◯ |
| CEx. 3 | 7 × 10³ | 110 | 145 | 50 | ◯ |
| CEx. 4 | 7 × 10³ | 110 | 300 | — | X |
| Ex. 9 | 1.6 × 10⁴ | 113 | 230 | 100 | ◯ |
| Ex. 10 | 2 × 10⁴ | 103 | 270 | 150 | ◯ |
| CEx. 5 | 5 × 10³ | 115 | 325 | 250 | ◯ |
| Ex. 11 | 4 × 10³ | 110 | 220 | 150 | ◯ |
| Ex. 12 | 4 × 10³ | 110 | 190 | 100 | ◯ |
| Ex. 13 | 6 × 10³ | 110 | 210 | 180 | ◯ |

| | Smoke | Thickness of film | Heat resis- | Firm adhe- | Biodegra- |

TABLE 1-continued

| | generation | (μm) | tance | siveness | dability |
|---|---|---|---|---|---|
| Ex. 1 | ◯ | 20 | ◯ | ◯ | ◯ |
| Ex. 2 | ◯ | 30 | ◯ | ◯ | ◯ |
| CEx. 1 | ◯ | 60 | ◯ | X | ◯ |
| CEx. 2 | X | — | — | — | — |
| Ex. 3 | ◯ | 30 | ◯ | ◯ | ◯ |
| Ex. 4 | ◯ | 20 | ◯ | ◯ | ◯ |
| Ex. 5 | ◯ | 20 | ◯ | ◯ | ◯ |
| Ex. 6 | ◯ | 25 | ◯ | ◯ | ◯ |
| Ex. 7 | ◯ | 20 | ◯ | ◯ | ◯ |
| Ex. 8 | ◯ | 30 | ◯ | ◯ | ◯ |
| CEx. 3 | ◯ | 60 | — | X | — |
| CEx. 4 | X | — | — | — | — |
| Ex. 9 | ◯ | 30 | ◯ | ◯ | ◯ |
| Ex. 10 | △ | 20 | ◯ | ◯ | ◯ |
| CEx. 5 | X | 12 | — | ◯ | X |
| Ex. 11 | ◯ | 20 | ◯ | ◯ | ◯ |
| Ex. 12 | ◯ | 30 | ◯ | ◯ | ◯ |
| Ex. 13 | ◯ | 20 | ◯ | ◯ | ◯ |

*Melt viscosity at 190° C., shear rate of 100 sec$^{-1}$
**Ex. represents Example and
CEx. represents Comparative Example

What is claimed is:

1. Polyester laminates formed by melt-extruding an aliphatic polyester having a melt viscosity of $1.0 \times 10^3$–$1.0 \times 10^5$ poises at a temperature of 190° C. and a shear rate of 100 sec$^{-1}$, and having a melting point of 70°–200° C.,
   wherein said alphatic polyester is obtained by adding from 0.1 to 5 parts by weight of diisocyanate to 100 parts by weight of a prepolymer in a molten state, wherein said prepolymer
      is obtained from a reaction of at least an aliphatic glycol and an aliphatic dicarboxylic acid, wherein the reaction includes (a) succinic acid, or its anhydride, reacted with 1,4-butanediol, (b) succinic acid, adipic acid, or their anhydride, reacted with 1,4-butanediol, or (c) succinic acid, or its anhydride, reacted with ethylene glycol, and
      has a number-average molecular weight of at least 10,000, onto a base selected from the group consisting of paper and cloth.

2. The polyester laminates as claimed in claim 1 wherein melt-extrusion is carried out at 150°–290° C. in terms of resin temperature.

3. The polyester laminates as claimed in claim 1 wherein the aliphatic polyester has a repeated chain structure in which a polyester prepolymer having a number-average molecular weight (Mn) of at least 10,000 and consisting of an aliphatic glycol and aliphatic dicarboxylic acid is bonded through urethane bonds.

4. The polyester laminates as claimed in claim 1 wherein the aliphatic polyester has a repeated chain structure in which a polyester prepolymer having a number-average molecular weight (Mn) of 10000 or more and obtained by reacting an aliphatic glycol, aliphatic dicarboxylic acid and, as a third component, at least one polyfunctional component selected from the group consisting of trifunctional or tetrafunctional polyols, oxycarboxylic acids and polybasic carboxylic acids or acid anhydrides thereof, is bonded through urethane bonds.

5. The polyester laminates as claimed in claim 4 wherein the polyester prepolymer contains one or more compounds selected from the group consisting of trimethylol propane, glycerin and pentaerythritol as the trifunctional or tetrafunctional polyol of the third component.

6. The polyester laminates as claimed in claim 4 wherein the polyester prepolymer contains one or more compounds selected from the group consisting of malic acid, citric acid and tartaric acid as the trifunctional or tetrafunctional oxycarboxylic acid of the third component.

7. The polyester laminates as claimed in claim 4 wherein the polyester prepolymer contains one or more compounds selected from the group consisting of trimesic acid, propane tricarboxylic acid, trimellitic anhydride, pyromellitic anhydride, benzophenone tetracarboxylic anhydride and cyclopentane tetracarboxylic anhydride as the trifunctional or tetrafunctional polybasic carboxylic acid of the third component.

8. A release material comprising a polyester laminate formed by melt-extruding an aliphatic polyester having a melt viscosity of $1.0 \times 10^3$–$1.0 \times 10^5$ posies at a temperature of 190° C. and a shear rate of 100 sec$^{-1}$ and having a melting point of 70°–200° C.,
   wherein said aliphatic polyester is obtained by adding from 0.1 to 5 parts by weight of diisocyanate to 100 parts by weight of a prepolymer in a molten state, wherein said prepolymer
      is obtained from a reaction of at least an aliphatic glycol and an aliphatic dicarboxylic acid, wherein the reaction includes (a) succinic acid, or its anhydride, reacted with 1,4-butanediol, (b) succinic acid, adipic acid, or their anhydride, reacted with 1,4-butanediol, or (c) succinic acid, or its anhydride, reacted with ethylene glycol, and
      has a number-average molecular weight of at least 10,000,
   onto a base selected from the group consisting of paper and cloth, wherein the polyester laminate has thereon an object to be released.

9. A material for containers, comprising a polyester laminate formed by melt-extruding an aliphatic polyester having a melt viscosity of $1.0 \times 10^3$–$1.0 \times 10^5$ poises at a temperature of 190° C. and a shear rate of 100 sec$^{-1}$, and having a melting point of 85°–200° C.,
   wherein said aliphatic polyester is obtained by adding from 0.1 to 5 parts by weight of diisocyanate to 100 parts by weight of a prepolymer in a molten state, wherein said prepolymer
      is obtained from a reaction of at least an aliphatic glycol and an aliphatic dicarboxylic acid, wherein the reaction includes (a) succinic acid, or its anhydride, reacted with 1,4-butanediol, (b) succinic acid, adipic acid, or their anhydride, reacted with 1,4-butanediol, or (c) succinic acid, or its anhydride, reacted with ethylene glycol, and
      has a number-average molecular weight of at least 10,000,
   onto paper.

* * * * *